(12) United States Patent
Kim et al.

(10) Patent No.: US 11,403,345 B2
(45) Date of Patent: Aug. 2, 2022

(54) METHOD AND SYSTEM FOR PROCESSING UNCLEAR INTENT QUERY IN CONVERSATION SYSTEM

(71) Applicant: NAVER CORPORATION, Seongnam-si (KR)

(72) Inventors: Sung Ju Kim, Seongnam-si (KR); Hyun-Je Song, Seongnam-si (KR); Inho Kang, Seongnam-si (KR); Yongsoo Seol, Seongnam-si (KR); SeungJun Lee, Seongnam-si (KR); Soobin Suh, Seongnam-si (KR); Jae Gwang Lee, Seongnam-si (KR); JongHyeog Choi, Seongnam-si (KR); Woongsub Kim, Seongnam-si (KR); Kyungduk Kim, Seongnam-si (KR); ChiYun Song, Seongnam-si (KR); Hye-Jeong Yeom, Seongnam-si (KR)

(73) Assignee: NAVER CORPORATION, Seongnam-si (KR)

( * ) Notice: Subject to any disclaimer, the term of this patent is extended or adjusted under 35 U.S.C. 154(b) by 261 days.

(21) Appl. No.: 16/804,276

(22) Filed: Feb. 28, 2020

(65) Prior Publication Data
US 2020/0279002 A1 Sep. 3, 2020

(30) Foreign Application Priority Data

Feb. 28, 2019 (KR) .................. 10-2019-0024309

(51) Int. Cl.
*G06F 16/9032* (2019.01)
*G06N 7/00* (2006.01)
*G06F 40/284* (2020.01)

(52) U.S. Cl.
CPC ...... *G06F 16/90332* (2019.01); *G06F 40/284* (2020.01); *G06N 7/005* (2013.01)

(58) Field of Classification Search
CPC .. G06F 16/90332; G06F 40/284; G06F 40/30; G06F 16/3344; G06F 16/245; G06F 16/3329; G06F 16/3343; G06F 3/167; G06F 40/35; G06F 16/45; G06F 40/20; G06F 40/205; G06F 9/451; G06F 16/35; G06F 16/953;
(Continued)

(56) References Cited

U.S. PATENT DOCUMENTS

| | | | |
|---|---|---|---|
| 11,036,724 B2* | 6/2021 | Huang | G06F 16/3329 |
| 2019/0103092 A1* | 4/2019 | Rusak | G06F 40/35 |
| 2019/0178643 A1* | 6/2019 | Metzler | G06T 17/00 |
| 2019/0236469 A1* | 8/2019 | Canim | G06N 5/045 |
| 2020/0135192 A1* | 4/2020 | Mukherjee | G10L 15/22 |
| 2021/0232414 A1* | 7/2021 | Maeda | G10L 15/26 |

FOREIGN PATENT DOCUMENTS

| | | | |
|---|---|---|---|
| CN | 107562816 A | * | 1/2018 |
| JP | 20140038150 A | | 2/2014 |

(Continued)

OTHER PUBLICATIONS

Korean Office Action issued by the Korean Patent Office in corresponding Korean patent application No. 10-2019-0024309, dated Apr. 27, 2020.
(Continued)

*Primary Examiner* — Linda Wong
(74) *Attorney, Agent, or Firm* — Greer Burns & Crain Ltd.

(57) ABSTRACT

A query processing method may include receiving a query based on an utterance of a user and a context associated with the user; analyzing an intent of the user for the query based on a natural language understanding (NLU) for the query; and in response to the intent of the user being undetermined through the analyzing, predicting the intent of the user using a deep learning based probabilistic model having the query and the context as an input.

19 Claims, 7 Drawing Sheets

(58) Field of Classification Search
CPC .... G06F 16/285; G06F 16/355; G06F 40/279; G06F 16/243; G06F 2203/011; G06F 40/216; G06F 2207/4824; G06F 40/44; G06N 7/005; G06N 3/08; G06N 3/0445; G06N 3/0472; G06N 20/00; G06N 5/04; G06N 3/02; G06N 5/045; G06N 5/046; G10L 15/00; G10L 2015/223; G10L 15/22; G10L 15/1822; G10L 15/1815; G10L 15/16; G10L 15/20; G10L 15/065; G10L 15/28; G10L 19/00; G10L 25/30; G10L 15/08

See application file for complete search history.

(56) References Cited

FOREIGN PATENT DOCUMENTS

| | | |
|---|---|---|
| JP | 20170021523 A | 1/2017 |
| JP | 2018169494 A | 11/2018 |
| KR | 100918644 B1 | 9/2009 |
| KR | 1020190002586 A | 1/2019 |
| WO | 2015079575 A1 | 6/2015 |

OTHER PUBLICATIONS

Office Action issued in Japanese patent application No. 2020-31802, dated Mar. 30, 2021.

\* cited by examiner

METHOD AND SYSTEM FOR PROCESSING UNCLEAR INTENT QUERY IN CONVERSATION SYSTEM

CROSS-REFERENCE TO RELATED APPLICATION(S)

This U.S. non-provisional application claims the benefit of priority under 35 U.S.C. § 119 to Korean Patent Application No. 10-2019-0024309 filed on Feb. 28, 2019, in the Korean Intellectual Property Office (KIPO), the entire contents of which are incorporated herein by reference.

BACKGROUND OF THE INVENTION

Field of Invention

One or more example embodiments of the following description relate to a method and a system for processing an unclear intent query in a conversation system.

Description of Related Art

There is a conversation system based on voice recognition. For example, Korean Patent Registration No. 10-0918644 relates to a conversation system and a dialog sentence generation method, and describes a conversation system that is configured to generate a dialog sentence through collection and concatenation of actually used sentences and words based on a voice recognition, and to output a sentence suitable for the position and the situation of the subjects of a conversation through a process of modifying and expanding a word definition.

Meanwhile, there are some unclear intent queries the conversation system does not answer. Here, the unclear intent queries may refer to queries that are difficult to interpret even though a human may recognize the contents of the query. In detail, the unclear intent queries may refer to queries through which an intent of a corresponding questioner is unverifiable from contents of a recognized query. For example, an unclear intent query may occur in response to a failure in recognizing a sentence or a word corresponding to an utterance of a user or in response to an occurrence of a false voice recognition by noise occurring in conditions excluding a user utterance.

Studies on the existing conversation system simply provide solutions for processing vocabularies not provided in the conversation system and do not suggest a solution for coping with a voice non-recognition or a false voice recognition. Accordingly, there is a need for a method that may process such an unclear intent query.

BRIEF SUMMARY OF THE INVENTION

One or more example embodiments provide a query processing method and system that may predict an intent of a questioner using a deep learning based probabilistic model with respect to an unclear intent query.

One or more example embodiments also provide a query processing method and system that may provide a response, such as a guide and a confirmation, based on an intent predicted for an unclear intent query and a partial analysis result of a natural language understanding (NLU).

According to an aspect of at least one example embodiment, there is provided a query processing method of a computer apparatus including at least one processor, the method including: by the at least one processor, receiving a query based on an utterance of a user and a context associated with the user; analyzing an intent of the user for the query based on an NLU for the query; and in response to the intent of the user being undetermined through the analyzing, predicting the intent of the user using a deep learning based probabilistic model having the query and the context as an input.

According to an aspect of at least one example embodiment, there is provided a non-transitory computer-readable record medium storing computer instructions that, when executed by a processor, cause the processor to perform the query processing method.

According to an aspect of at least one example embodiment, there is provided a computer apparatus including: at least one processor configured to execute computer-readable instructions. The at least one processor is configured to receive a query based on an utterance of a user and a context associated with the user, analyze an intent of the user for the query based on an NLU for the query, and in response to the intent of the user being undetermined through the analyzing, predict the intent of the user using a deep learning based probabilistic model having the query and the context as an input.

According to some example embodiments, it is possible to predict an intent of a questioner using a deep learning based probabilistic model with respect to an unclear intent query.

Also, according to some example embodiments, it is possible to provide a response, such as a guide and a confirmation, based on an intent predicted for an unclear intent query and a partial analysis result of an NLU.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

Example embodiments will be described in more detail with regard to the figures, wherein like reference numerals refer to like parts throughout the various figures unless otherwise specified, and wherein.

Figure 1:
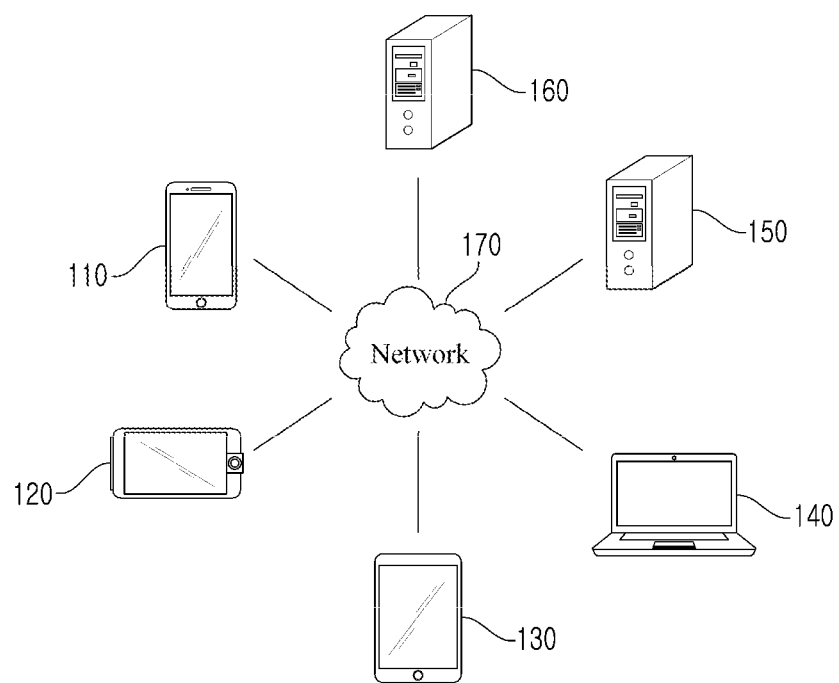
FIG. 1 illustrates an example of a network environment according to an example embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION OF THE INVENTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware and/or a combination of hardware and software. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor), Central Processing Unit (CPU), a controller, an arithmetic logic unit (ALU), a digital signal processor, a microcomputer, a microprocessor, etc., the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable storage mediums, including the tangible or non-transitory computer-readable storage media discussed herein.

According to one or more example embodiments, computer processing devices such as processors may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blue-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

A query processing system according to example embodiments may be configured using the following computer apparatus. Here, a computer program according to example embodiments may be installed and executed on the computer apparatus and the computer apparatus may perform a query processing method under control of the executed computer program. The computer program may be stored in a non-transitory computer-readable record medium to perform the query processing method in a computer in conjunction with the computer apparatus. Depending on example embodiments, the query processing system may be implemented through connection between two or more computer apparatuses.

FIG. 1 is a diagram illustrating an example of a network environment according to an example embodiment. Referring to FIG. 1, the network environment includes a plurality of electronic devices 110, 120, 130, 140, a plurality of servers 150, 160, and a network 170. FIG. 1 is provided as an example only and thus, the number of electronic devices and/or the number of servers are not limited thereto. Also, the network environment of FIG. 1 is merely provided to describe an example of environments applicable to the example embodiments, and an environment applicable to the example embodiments is not limited to the network environment of FIG. 1.

Each of the plurality of electronic devices 110, 120, 130, 140 may be a fixed terminal or a mobile terminal configured as a computer apparatus. For example, the plurality of electronic devices 110, 120, 130, 140 may be a smartphone, a mobile phone, a navigation, a computer, a laptop computer, a digital broadcasting terminal, a personal digital assistant (PDA), a portable multimedia player (PMP), a tablet personal computer (PC), and the like. For example, although FIG. 1 illustrates a shape of a smartphone as an example of the electronic device 110, the electronic device 110 may refer to one of various physical computer apparatuses capable of communicating with other electronic devices 120, 130, 140, and/or the servers 150, 160 over the network 170 in a wired communication manner or in a wireless communication manner.

The communication scheme is not particularly limited and may include a communication method using a near field communication between devices as well as a communication method using a communication network, for example, a mobile communication network, the wired Internet, the wireless Internet, a broadcasting network, etc., which may be included in the network 170. For example, the network 170 may include at least one of network topologies that include, for example, a personal area network (PAN), a local area network (LAN), a campus area network (CAN), a metropolitan area network (MAN), a wide area network (WAN), a broadband network (BBN), and the Internet. Also, the network 170 may include at least one of network topologies that include a bus network, a star network, a ring network, a mesh network, a star-bus network, a tree or hierarchical network, and the like. However, these are only examples and the example embodiments are not limited thereto.

Each of the servers 150, 160 may be configured as a computer apparatus or a plurality of computer apparatuses that provides instructions, codes, files, contents, services, and the like through communication with the plurality of electronic devices 110, 120, 130, 140 over the network 170. For example, the server 150 may be a system that provides a service to the plurality of electronic devices 110, 120, 130, 140 connected over the network 170. Here, the service may be, for example, a conversation service, a map service, a translation service, a financial service, a payment service, a social network service (SNS), a messaging service, a search service, a mail service, a content providing service, and the like.

Figure 2:
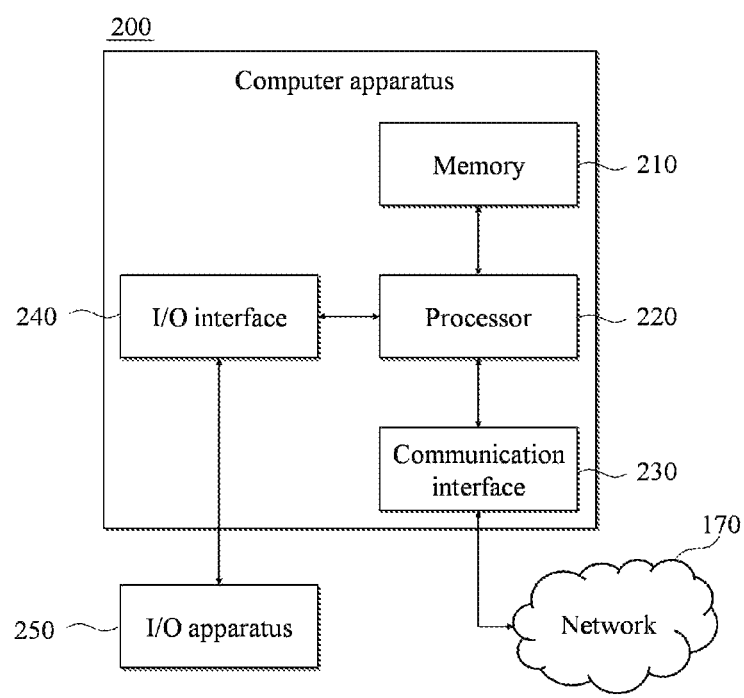
FIG. 2 illustrates an example of a computer apparatus according to an example embodiment.

FIG. 2 is a block diagram illustrating an example of a computer apparatus according to an example embodiment. Each of the plurality of electronic devices 110, 120, 130, 140 and each of the servers 150 and 160 may be configured by a computer apparatus 200 of FIG. 2.

Referring to FIG. 2, the computer apparatus 200 may include a memory 210, a processor 220, a communication interface 230, and an input/output (I/O) interface 240. The memory 210 may include a permanent mass storage device, such as random access memory (RAM), a read only memory (ROM), and a disk drive, as a non-transitory computer-readable storage medium. The permanent mass storage device, such as ROM and disk drive, may be included in the computer apparatus 200 as a permanent storage device separate from the memory 210. Also, an OS and at least one program code may be stored in the memory 210. The software components may be loaded to the memory 210 from another non-transitory computer-readable medium separate from the memory 210. The other non-transitory computer-readable storage medium may include a non-transitory computer-readable storage medium, for example, a floppy drive, a disk, a tape, a DVD/CD-ROM drive, a memory card, etc. According to other example embodiments, software components may be loaded to the memory 210 through the communication interface 230 instead of, or in addition to, the non-transitory computer-readable storage medium. For example, software components may be loaded to the memory 210 of the computer apparatus 200 based on a computer program installed by files received over the network 170.

The processor 220 may be configured to process computer-readable instructions of a computer program by performing basic arithmetic operations, logic operations, and I/O operations. The computer-readable instructions may be provided from the memory 210 or the communication interface 230 to the processor 220. For example, the processor 220 may be configured to execute received instructions in response to the program code stored in the storage device, such as the memory 210.

The communication interface 230 may provide a function for communication between the computer apparatus 200 and another apparatus, for example, the aforementioned storage devices, over the network 170. For example, the processor 220 of the electronic apparatus 200 may transfer data, a file, a request or an instruction created based on the program code stored in the storage device, such as the memory 210, to other apparatuses over the network 170 under control of the communication interface 230. Inversely, a signal, an instruction, data, a file, etc., from the other apparatus may be received at the computer apparatus 200 through the communication module 230 of the computer apparatus 200 by going through the network 170. For example, a signal, an instruction, data, etc., received through the communication interface 230 may be transferred to the processor 220 or the memory 210, and a file, etc., may be stored in a storage medium, for example, the permanent mass storage device, further includable in the computer apparatus 200.

The I/O interface 240 may be a device used for interface with an I/O apparatus 250. For example, an input device of the I/O apparatus 250 may include a device, such as a microphone, a keyboard, a mouse, and the like, and an output device of the I/O apparatus 250 may include a device, such as a display, a speaker, and the like. As another example, the I/O interface 240 may be a device for interface with an apparatus in which an input function and an output function are integrated into a single function, such as a touchscreen. The I/O apparatus 250 may be configured as a single apparatus with the computer apparatus 200.

According to other example embodiments, the electronic device 200 may include a number of components greater than or less than the number of components shown in FIG. 2. However, there is no need to clearly illustrate many components according to the related art. For example, the computer apparatus 200 may include at least a portion of the I/O apparatus 250, or may further include other components, for example, a transceiver, a database (DB), and the like.

Figure 3:
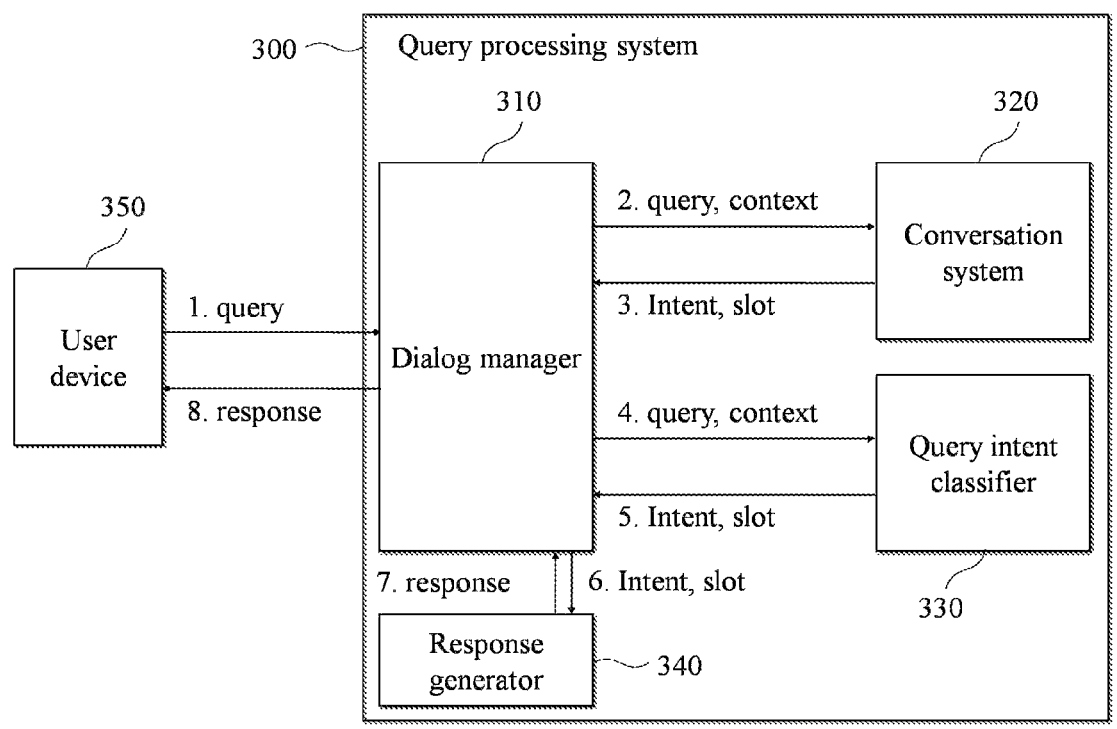
FIG. 3 illustrates an example of a query processing system according to an example embodiment.

FIG. 3 illustrates an example of a query processing system according to an example embodiment. Referring to FIG. 3, a query processing system 300 according to the example embodiment may include a dialog manager 310, a conversation system 320, a query intent classifier 330, and a response generator 340. Here, the dialog manager 310, the conversation system 320, the query intent classifier 330, and the response generator 340 may be configured by a single physical device or may be configured to be distributed over two or more physical devices. For example, the dialog manager 310 and the response generator 340 may be configured in an artificial intelligence (AI) speaker or a smartphone as a user device 350 configured as the computer apparatus 200, and the conversation system 320 and the query intent classifier 330 may be configured in the server 150 that communicates with the AI speaker or the smartphone over the network 170. As another example, the dialog manager 310 may be configured in the AI speaker or the smartphone, and the conversation system 320, the query intent classifier 330, and the response generator 340 may be configured in the server 150. In this case, the dialog manager 310 may control the user device 350 to communicate with each of the conversation system 320, the query intent classifier 330, and the response generator 340 configured in the server 150 over the network 170. Physically, communication may be performed between the user device 350 and the server 150. The dialog manager 310, the conversation system 320, the query intent classifier 330, and the response generator 340 may be functional expressions of the processor 220 of the computer apparatus 200 for the user device 350 or the server 150.

The dialog manager 310 may be provided between the user device 350 and other modules, for example, the conversation system 320, the query intent classifier 330, and the response generator 340 of the query processing system 300, and may manage an I/O protocol and the context. Here, the context may include metadata that includes information about a status of the user device 350 and a dialog history. The dialog manager 310 may receive a query forwarded from the user device 350. Here, the query forwarded from the dialog manager 310 may include a sound signal occurring when an utterance of the user is received through a microphone included in the user device 350. For example, if the dialog manager 310 is configured in the user device 350, the dialog manager 310 may internally receive a sound signal input from a module that manages the microphone of the user device 350 through the microphone. If the dialog manager 310 is configured in a physical device different from the user device 350, the dialog manager 310 may receive a sound signal from the user device 350 over the network 170.

A sound recognition for the sound signal may be performed through one of the dialog manager 310 and the conversation system 320. In the following, a sentence or a word recognized through the sound recognition is also described as a "query." The dialog manager 310 may forward, to the conversation system 320, at least a portion of the forwarded query and the context being managed, such as, for example, information about the current device status and information about a dialog history corresponding the current desired duration. If the dialog manager 310 and the conversation system 320 are configured in different physical devices, a query and a context may be forwarded through communication over the network 170 between the different physical devices.

The conversation system 320 may determine an intent of the user based on a dialog state management based on the context and a natural language understanding (NLU) for the forwarded query. Here, the "intent" may refer to an intent of the user analyzed from the query and a single intent may be mapped to a single response function. Also, a slot may refer to information analyzed with the intent from the query and may include information, such as a target for the intent. For example, an intent in a query "set an alarm for 7 A.M." may include a demanding action of the user to set an alarm such as "set_alarm" and a slot may include a target for the intent, such as {time: 7 A.M.}. As another example, an intent in a query "play a song B of a singer A" may include a demanding action of the user to play music such as "play_music" and a slot may include a target for the intent, such as {artist: singer A}, {track_name: song B}. The conversation system 320 may forward the analyzed intent and slot to the dialog manager 310. The slot may also refer to additional information and may not be acquired through the query. For example, a query "play music" may be simply used to analyze only the intent of the user and may not include information about a target of the query.

Also, as described above, an unclear intent query may be present. In the case of the unclear intent query, the conversation system 320 may not determine the intent of the user. Here, the query intent classifier 330 may be used.

The query intent classifier 330 may predict an intent using a statistical, neural net based model with respect to unclear intention queries that are queries the conversation system 320 does not answer. That is, with respect to an unclear intent query from which the conversation system 320 may not analyze the intent of the user through an NLU, the query intent classifier 330 may predict the intent through an intent classification based on a recent dialog state, a status of an activated device, and a tokenized input sentence. The intent prediction of the query intent classifier 330 is further described below. The query intent classifier 330 may forward the predicted intent and slot to the dialog manager 310.

In this case, the dialog manager 310 may acquire an intent and/or a slot even with respect to an unclear intent query as well as a general query, and may forward the acquired intent and/or slot to the response generator 340 to generate a response to the query.

The response generator 340 may execute a function of receiving the intent and/or the slot determined and/or predicted by the conversation system 320 and/or the query intent classifier 330 through the dialog manager 310 and matching the received intent and slot. Also, the response generator 340 may generate a response to the query and may forward the response to the dialog manager 310. The dialog manager 310 may forward the response to the user device 350. That the response generator 340 executes the matching function may include providing an instruction to execute the matching function.

Here, the response generator 340 may immediately execute a corresponding function with respect to the intent determined by the conversation system 320. For example, a music playback function may be immediately executed with a response "I'll play music" for a query "Play music." In contrast, although the response generator 340 may immediately execute a corresponding function with respect to the intent predicted by the query intent classifier 330, the response generator 340 may generate a guide response or a confirmation response and may receive a confirmation from the user regarding whether the predicted intent is appropriate. Here, the guide response may refer to a response for specifying a function the user desires to execute as a predicted intent of the user and providing a guide about a method of using the corresponding function. Also, the confirmation response may refer to a response for specifying a function the user desires to execute as a predicted intent of the user and receiving a confirmation from the user regarding on execution of the specified function. For example, if the query intent classifier 330 predicts an intent "play_music" with respect to an unclear intent query with respect to which an intent of the user is not determined by the conversation system 320, the response generator 340 may generate a confirmation response, such as "Shall I play music?" or a guide response for providing the user with a guide about a method of using the function, such as "If you want to listen to music, please say 'Play music'" and may forward the generated confirmation response or guide response to the user rather than immediately executing the music playback function.

As described above, dissimilar to existing conversation systems that simply request the user to utter again with respect to the unclear intent query, the unclear intent query may be processed by predicting an intent that is mostly likely, that is, having a high likelihood using a deep learning based probabilistic model and by providing a guide response or a confirmation response with respect to the predicted intent.

Figure 4:
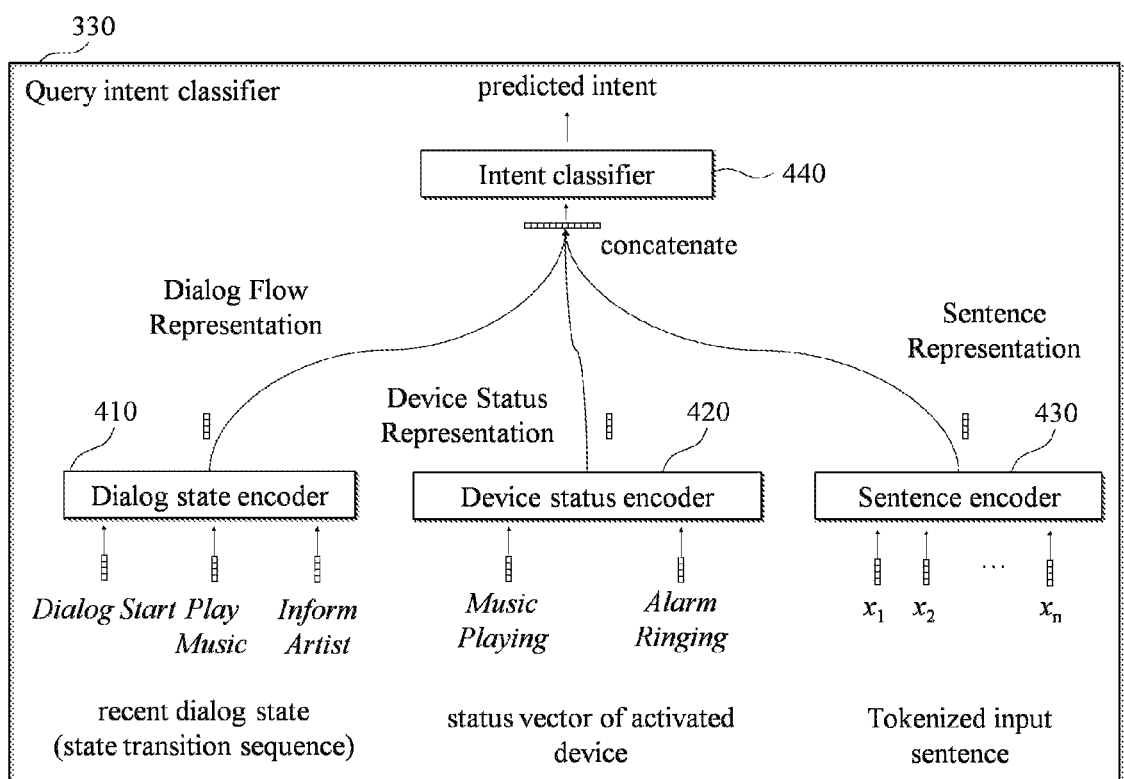
FIG. 4 illustrates an example of an intent prediction process according to an example embodiment.

FIG. 4 illustrates an example of an intent prediction process according to an example embodiment. Referring to FIG. 4, the query intent classifier 330 of FIG. 3 may include a dialog state encoder 410, a device status encoder 420, a sentence encoder 430, and an intent classifier 440. Depending on example embodiments, the query intent classifier 330 may include the intent classifier 440, and may include at least one of the dialog state encoder 410, the device status encoder 420, and the sentence encoder 430.

The dialog state encoder 410 may analyze a dialog history included in a context forwarded from the dialog manager 310 and may generate a Dialog Flow Representation including a state transition sequence with respect to recent dialogs. For example, a recurrent neural network (RNN) that is an artificial neural network structure generally used for a natural language processing (NLP) may be used to determine a state of each of individual dialogs of the dialog history. In detail, the dialog state encoder 410 may input a recent dialog history to the RNN that is trained to output a state of an input dialog and may acquire a Dialog Flow Representation including a transition sequence of a recent dialog state. Although an example of using the RNN is described to help the understanding of the disclosure, those skilled in the art may readily understand that another neural net based classification model may be used.

The device status encoder 420 may generate a Device Status Representation including a status vector based on information about statuses for the respective items of the device included in the context forwarded from the dialog manager 310. The Device Status Representation may also be acquired based on a neural net based classification model. For example, the neural net based classification model for the device status encoder 420 may be trained to output one of statuses preset for a specific item based on status information of the specific item of the device. Here, a single status vector may be configured by concatenating output statuses with respect to a plurality of item-by-item statuses.

The sentence encoder 430 may input a query to a neural net based classification model, for example, a bidirectional RNN, and may generate a Sentence Representation including a tokenized input sentence. For example, the neural net based classification model for the sentence encoder 430 may be trained to tokenize an input sentence included in the input query and to output a sequence of tokenized texts.

Here, the intent classifier 440 may generate an entire representation by concatenating the Dialog Flow Representation, the Device Status Representation, and the Sentence Representation generated by the dialog state encoder 410, the device status encoder 420, and the sentence encoder 430, respectively. Here, the intent classifier 440 may determine an intent corresponding to the concatenated entire representation through the deep learning based probabilistic model based on a statistical probability and may output the determined intent.

That is, the query intent classifier 330 may use the deep learning based probabilistic model that combines the recent dialog flow, the current device status, and representations acquired for the respective queries and predicts an intent corresponding to the combined representations, and may statistically predict an intent corresponding to an unclear intent query with respect to which an intent of the user may not be analyzed from the query itself through the deep learning based probabilistic model.

Also, although the conversation system 320 does not determine the intent through an NLU for the unclear intent query, a slot may be extracted.

Figure 5:
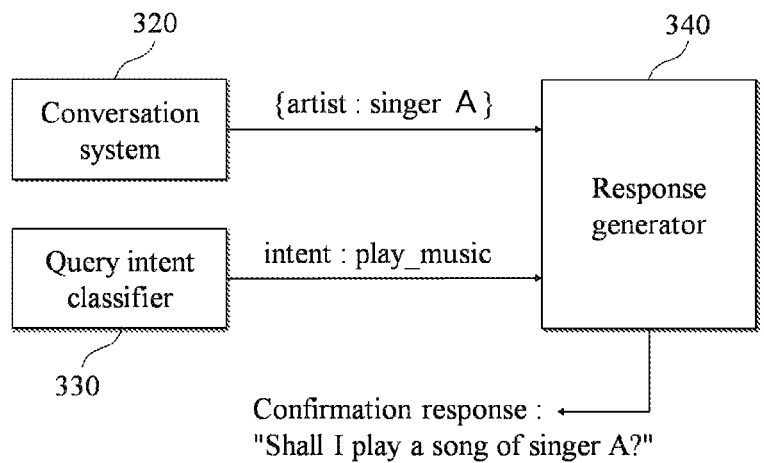
FIG. 5 illustrates an example of processing of an unclear intent query according to an example embodiment.

FIG. 5 illustrates an example of processing an unclear intent query according to an example embodiment. FIG. 5 illustrates an example of a situation in which a query "Playa singer A sang" is recognized through a sound recognition for a user utterance "Play a song of singer A." The conversation system 320 may recognize a slot {artist: singer A} from the query through an NLU, and may not understand a corresponding intent. Accordingly, the query intent classifier 330 may operate to analyze a dialog history, a device status, and the like, as well as the query using a deep learning based probabilistic model and to predict the intent "intent: play_music." In this case, the response generator 340 may generate a confirmation response "Shall I play a song of singer A?" based on the predicted intent "intent: play_music" and the slot {artist: singer A} received from the conversation system 320 and the query intent classifier 330 through the dialog manager 310 and may provide the generated confirmation response. That is, instead of requesting the user to utter again and receiving the user utterance again with respect to "Playa singer A sang," a confirmation about the predicted intent "intent: play_music" for the recognized slot {artist: singer A} may be received. In this manner, a further appropriate dialog with the user may be made.

As another example, in a situation in which a query "Tun off" is recognized through a sound recognition from a user utterance "Turn off," the conversation system 320 may not recognize a corresponding intent from the query through an NLU. Here, the query intent classifier 330 may analyze a dialog history, a dialog state, and the like as well as the query "Tun off" through a deep learning based probabilistic model and may predict the intent "intent: turn_off." In this case, the response generator 340 may generate a confirmation response "Shall I turn off?" using the predicted intent "intent: turn_off" received from the query intent classifier 330 through the dialog manager 310 and may provide the generated confirmation response.

Figure 6:
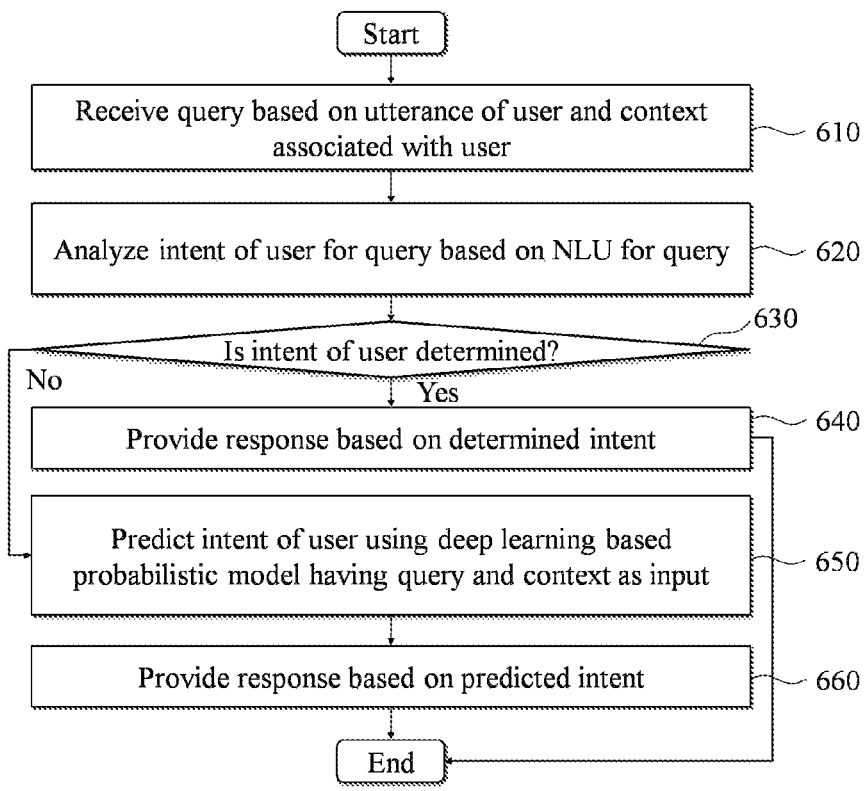
FIG. 6 is a flowchart illustrating an example of a query processing method according to an example embodiment.

FIG. 6 is a flowchart illustrating an example of a query processing method according to an example embodiment. The query processing method of FIG. 6 may be performed by the computer apparatus 200 of FIG. 2. For example, the processor 220 of the computer apparatus 200 may be configured to execute a control instruction according to a code of at least one program or a code of an OS included in the memory 210. Here, the processor 220 may control the computer apparatus 200 to perform operations 610 to 660 included in the query processing method of FIG. 6 in response to a control instruction provided from a code stored in the computer apparatus 200.

Referring to FIG. 6, in operation 610, the computer apparatus 200 may receive a query based on an utterance of a user and the context associated with the user. Here, the query may forwarded from the user device 350 that receives a user utterance, and the context may include information about at least a portion of a dialog history associated with the user and a status for each of a plurality of items of the user device 350 that receives the user utterance. For example, the query and the context may correspond to the query and the context forwarded from the dialog manager 310 of FIG. 3. As described above, the dialog manager 310 may provide the query provided from the user device 350 and the context managed by the dialog manager 310. According to an example embodiment, the computer apparatus 200 may be a physical device in which the conversation system 320 and the query intent classifier 330 are configured.

In operation 620, the computer apparatus 200 may analyze an intent of the user for the query based on an NLU for the query. Depending on example embodiments, the computer apparatus 200 may also analyze the intent of the user by further using a dialog state management based on the context. The example embodiment in which the conversation system 320 analyzes and determines the intent of the user using all of the query and the context is described above.

In operation 630, the computer apparatus 200 may determine whether the intent of the user is determined. If the intent of the user is determined through the analyzing of operation 620, the computer apparatus 200 may perform operation 640. If the intent of the user is not determined through the analyzing of operation 620, the computer apparatus 200 may perform operation 650.

In operation 640, the computer apparatus 200 may provide a response based on the determined intent. If the intent of the user is determined based on the NLU for the query or by further using the dialog state management based on the context, the computer apparatus 200 may provide the response based on the determined intent. In this case, the computer apparatus 200 may further include the response generator 340 of FIG. 3. If the computer apparatus 200 includes only the conversation system 320 and the query intent classifier 330, the computer apparatus 200 may be configured to provide the determined intent or the following predicted intent.

In operation 650, the computer apparatus 200 may predict the intent of the user using a deep learning based probabilistic model having the query and the context as an input. For example, the computer apparatus 200 may generate an entire representation for an intent prediction by concatenating at least two of a Dialog Flow Representation including a transition sequence of a dialog state acquired based on a dialog history included in the context, a Device Status Representation including a status vector about statuses of a device further included in the context, and a Sentence Representation including a tokenized input sentence for the query, and may predict, as the intent of the user, an intent that is determined based on a statistical probability corresponding to the entire representation through the deep learning based probabilistic model. According to an example embodiment, the Dialog Flow Representation may include a state transition sequence of the dialog history acquired through a neural net based classification model that is trained to determine a state of an input dialog, and the Device Status Representation may include a status vector of the device acquired using a neural net based classification model that is trained to output one of statuses preset for a specific item based on status information of the specific item. Also, the Sentence Representation may include a tokenized input sentence for the query acquired using a neural net based classification model that is trained to tokenize an input sentence and to output a sequence of tokenized texts.

In operation 660, the computer apparatus 200 may provide a response based on the predicted intent. For example, the computer apparatus 200 may specify a function based on the predicted intent, and may generate and forward a confirmation response for receiving a confirmation from the user on execution of the specified function or a guide response for providing a guide about a method of using the specified function. Here, depending on example embodiments, the computer apparatus 200 may generate a response by further using a partial analysis result acquired based on the NLU for the query. For example, the partial analysis result may include information, for example, the aforementioned slot, about a target of the predicted intent.

Figure 7:
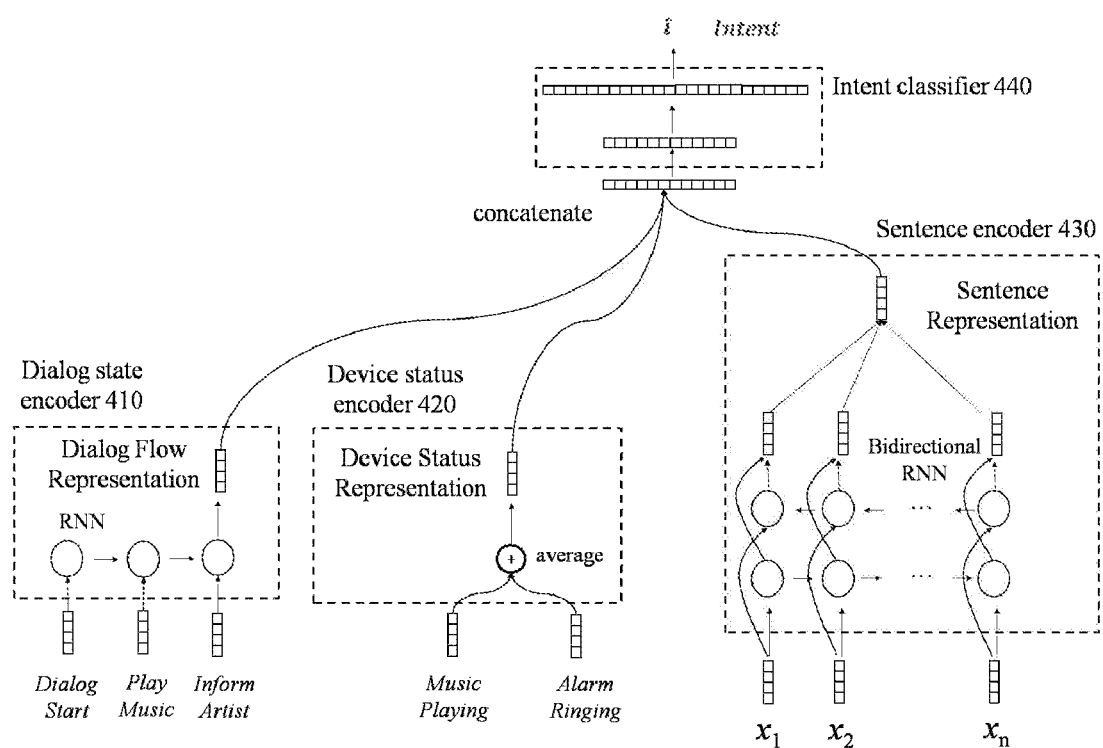
FIG. 7 illustrates an example of a representative model of a query intent classifier according to an example embodiment.

FIG. 7 illustrates an example of a representative model of a query intent classifier according to an example embodiment. FIG. 7 illustrates an example of a representative model available in the query intent classifier 330 of FIG. 3.

FIG. 7 illustrates the dialog state encoder 410, the device status encoder 420, the sentence encoder 430, and the intent classifier 440, which are described above with reference to FIG. 4. Here, FIG. 7 illustrates an example in which the dialog state encoder 410 uses an RNN as a neural net based classification model and the sentence encoder 430 uses a bidirectional RNN as a neural net based classification model. The device status encoder 420 uses an average of status values instead of using the neural net based classification model. Acquired representations may be concatenated by the intent classifier 440. An intent of the user may be predicted even with respect to an unclear intent based on a statistical probability using a deep learning based probabilistic model according to the concatenated entire representation.

According to some example embodiments, it is possible to predict an intent of a questioner using a deep learning based probabilistic model with respect to an unclear intent query. Also, according to some example embodiments, it is possible to provide a response, such as a guide and a confirmation, based on an intent predicted for an unclear intent query and a partial analysis result of natural language understanding (NLU).

The systems and/or apparatuses described herein may be implemented using hardware components, software components, and/or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable storage mediums.

The methods according to the example embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts.

Examples of non-transitory computer-readable media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be to act as one or more software modules in order to perform the operations of the above-described embodiments, or vice versa.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A query processing method comprising:
   inputting a query into an input of a user device, the query being based on an utterance of a user and a context associated with the user;
   transmitting the query via a network to at least one processor from the user device;
   analyzing the query for an intent of the user by the at least one processor based on a natural language understanding (NLU) for the query;
   predicting the intent of the user by the at least one processor by using a deep learning based probabilistic model having the query and the context as an input when the intent of the user is undetermined from the analyzing of the query;
   providing a response from the at least one processor to the user device based on the predicted intent of the user and the context associated with the user; and
   executing a function by the at least one processor when the user confirms that the predicted intent associated with the response is a correct intent of the user.

2. The method of claim 1, wherein the context includes information about at least a portion of a dialog history associated with the user and a status for each of a plurality of items of a device of the user receiving the utterance of the user.

3. The method of claim 1, wherein the predicting of the intent of the user comprises generating an entire representation for an intent prediction by concatenating at least two of a Dialog Flow Representation including a transition sequence of a dialog state acquired based on a dialog history included in the context, a Device Status Representation including a status vector about statuses of a device further included in the context, and a Sentence Representation including a tokenized input sentence for the query, and predicting, as the intent of the user, an intent that is determined based on a statistical probability corresponding to the entire representation through the deep learning based probabilistic model.

4. The method of claim 3, wherein the Dialog Flow Representation includes a state transition sequence of the dialog history acquired through a neural net based classification model that is trained to determine a state of an input dialog.

5. The method of claim 3, wherein the Device Status Representation includes a status vector of the device acquired using a neural net based classification model that is trained to output one of statuses preset for a specific item based on status information of the specific item.

6. The method of claim 3, wherein the Sentence Representation includes a tokenized input sentence for the query acquired using a neural net based classification model that is trained to tokenize an input sentence and to output a sequence of tokenized texts.

7. The method of claim 1, wherein the providing of the response comprises:
   specifying a function based on the predicted intent, and generating and forwarding a confirmation response for receiving a confirmation from the user on execution of the specified function or a guide response for providing a guide about a method of using the specified function.

8. The method of claim 1, wherein the providing of the response comprises generating the response by further using a partial analysis result acquired based on the NLU for the query.

9. The method of claim 8, wherein the partial analysis result includes information about a target of the predicted intent.

10. The method of claim 1, wherein the analyzing of the intent of the user comprises analyzing the intent of the user by further using a dialog state management based on the context.

11. A non-transitory computer-readable record medium storing computer instructions that, when executed by a processor, cause the processor to perform the query processing method of claim 1.

12. A computer apparatus comprising:
    at least one processor configured to execute computer-readable instructions,
    wherein the at least one processor is configured to:
    receive a query from a user device, the query being based on an utterance of a user and a context associated with the user,
    analyze the query for an intent of the user based on a natural language understanding (NLU) for the query,
    predict the intent of the user using a deep learning based probabilistic model having the query and the context as an input when the intent of the user is undetermined from the analyzing of the query,
    provide a response to the user device based on the predicted intent of the user and the context associated with the user, and
    execute a function when the user confirms that the predicted intent associated with the response is a correct intent of the user.

13. The computer apparatus of claim 12, wherein the context includes information about at least a portion of a dialog history associated with the user and a status for each of a plurality of items of a device of the user receiving the utterance of the user.

14. The computer apparatus of claim 13, wherein the at least one processor is further configured to
    generate an entire representation for an intent prediction by connecting at least two of a Dialog Flow Representation including a transition sequence of a dialog state acquired based on a dialog history included in the context, a Device Status Representation including a status vector about states of a device further included in the context, and a Sentence Representation including a tokenized input sentence for the query, and predict, as the intent of the user, an intent that is determined based on a statistical probability corresponding to the entire representation through the deep learning based probabilistic model.

15. The computer apparatus of claim 14, wherein the Dialog Flow Representation includes a state transition sequence of the dialog history acquired through a neural net based classification model that is trained to determine a state of an input dialog.

16. The computer apparatus of claim 14, wherein the Device Status Representation includes a status vector of the device acquired using a neural net based classification model that is trained to output one of statuses preset for a specific item based on status information of the specific item.

17. The computer apparatus of claim 14, wherein the Sentence Representation includes a tokenized input sentence for the query acquired using a neural net based classification model that is trained to tokenize an input sentence and to output a sequence of tokenized texts.

18. The method of claim 1, wherein providing the response includes providing a confirmation response requesting confirmation by the user that the predicted intent is the correct intent.

19. The computer apparatus of claim 12, wherein the response includes providing a confirmation response requesting confirmation by the user that the predicted intent is the correct intent.

* * * * *